United States Patent [19]

Relzmann

[11] Patent Number: 4,729,338

[45] Date of Patent: Mar. 8, 1988

[54] MNEMONIC IDENTIFICATION MEANS

[76] Inventor: Alfred Relzmann, Oakridge E (#61), Deerfield Beach, Fla. 33442

[21] Appl. No.: 50,956

[22] Filed: May 18, 1987

[51] Int. Cl.$^4$ .......................... B60Q 11/00; B61L 15/00
[52] U.S. Cl. .................................. 116/209; 116/28 R; 116/30; 116/173
[58] Field of Search .............. 116/28 R, 30, 209, 173, 116/174, 175, DIG. 24, DIG. 33; 40/592

[56] References Cited

U.S. PATENT DOCUMENTS

| | | | |
|---|---|---|---|
| 2,192,514 | 3/1940 | Carleton | 116/173 |
| 2,342,017 | 2/1944 | Shepard | 116/173 |
| 3,036,545 | 5/1962 | Legg | 116/28 R |
| 3,107,648 | 10/1963 | Lundstrom | 116/173 |
| 3,136,289 | 6/1964 | Johnson | 116/28 R |
| 3,286,386 | 11/1966 | Glantz | 40/592 |
| 3,320,920 | 5/1967 | Lusebrink | 116/28 R |
| 3,363,600 | 1/1968 | Gary | 116/28 R |
| 3,495,568 | 2/1970 | Palinkos | 116/173 |
| 3,636,912 | 1/1972 | Kamp | 116/173 |
| 3,712,263 | 1/1973 | Faragosa | 116/28 R |

Primary Examiner—Charles Frankfort
Assistant Examiner—Thomas B. Will
Attorney, Agent, or Firm—Melvin K. Silverman

[57] ABSTRACT

A mnemonic system for identifying one object out of many substantially like objects. The system includes an elastomeric adhesion device proportioned for placement upon a horizontal surface of the object to be identified. Also included is an elongate resilient linear member having a first end and a second end, the member secured, at the first end to the adhesion element, in a vertical orientation relative to the surface of the object to be identified. Also provided are several resilient uniplanar elements, each of the elements having several holes, each of the holes proportioned to permit the slideable passage of the second end of the linear member through a selected pair of such holes after a bending of the uniplanar element has occurred. Such holes are proportioned to frictionally contact the linear member after the passage of the linear member therethru, thereby maintaining said uniplanar elements in a resiliently deformed co-action with the linear elememt. The orientation of one or more of the uniplanar elements may be selectively changed through change in the selected pair of holes within a particular uniplanar element through which the linear member has been frictionally passed. Through the use of a predetermined sequence of respective orientations of adjacently located uniplanar elements, the identification of one object out of a large number of like objects may be achieved.

10 Claims, 7 Drawing Figures

MNEMONIC IDENTIFICATION MEANS

BACKGROUND OF THE INVENTION

A problem exists when an automobile is left in a location such as a shopping mall where there are parked a great number of substantially identical vehicles and a period of time has passed. Many individuals experience problems in identifying such locations when the location to be identified is but one among a large number of substantially identical locations. Accordingly, the present invention addresses itself to a simple solution of this problem.

SUMMARY OF THE INVENTION

The present invention constitutes a mnemonic means for the identifying of one object out of a multiplicity of substantially like objects. The invention more particularly comprises an elastomeric adhesion means proportioned for placement upon a substantially horizontal surface of the object to be identified. There is further provided an elongate resilient linear member having a first end and a second end, said member secured at said first end to said ahesion means and in a substantially vertical orientation relative to the horizontal surface of the object to be identified. The invention also includes a plurality of uniplanar elements, each of said elements having therein a plurality of holes, each of said holes proportioned to permit the slideable passage of said second end of said linear member through a selected pair of said holes after a bending of said uniplanar element has occurred. Said holes are proportioned to frictionally contact said linear member after said passage of said linear element therethrough has occurred to thereby maintain said elements in a resiliently deformed co-action with said linear element. The orientation of one or more of said pluralities of uniplanar elements may be selectively changed through a change of a selected pair of holes within said uniplanar element through which said linear member is frictionally passed. Through the use of a predetermined sequence of respective orientations of the individual elements of said plurality of elements, the identification of the said one object, out of said multiplicity of substantially similar objects, may be achieved.

It is an object of the present invention to provide a means for readily identifying one object out of a multiplicity of substantially identical objects.

It is another object of the invention to provide a mnemonic means for the ready identification of one automobile vehicle out of a multiplicity of vehicles as, typically, will exist in a shopping mall situation.

The above and yet other objects of the present invention will become apparent from the hereinafter set forth detailed description of the invention, the drawings, and claims appended herewith.

DETAILED DESCRIPTION OF THE DRAWINGS

FIGS. 4a-c is a representational view of three possible combinations of orientation of the uniplanar elements onto the linear member.

Figure 5:
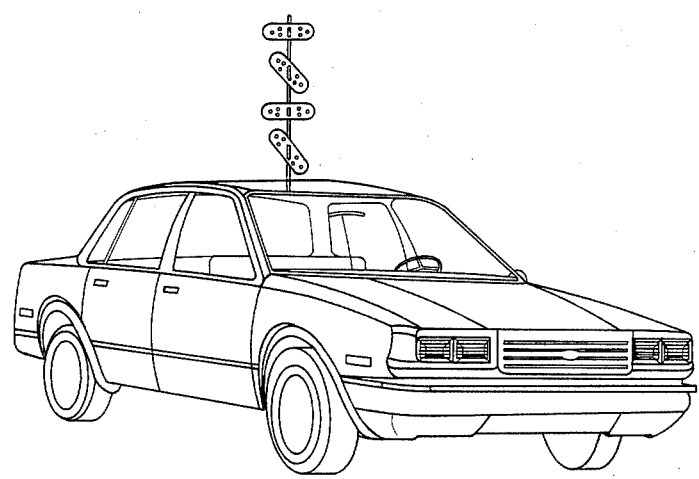

FIG. 5 is a perspective view showing the inventive identifying means on the roof of an automobile.

DETAILED DESCRIPTION OF THE INVENTION

Figure 1:
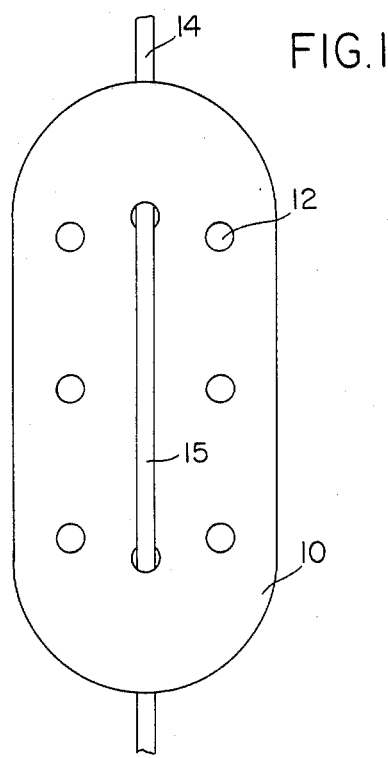
FIG. 1 is a front perspective view of one uniplanar element inserted onto the resillient linear member.

With reference to FIG. 1 there is shown a resilient uniplanar element 10 which, in the illustrated embodiment, is provided with a matrix of holes 12. The generalized periphery of the uniplanar element 10 is that of an oval. It may be appreciated that other peripheral configurations and, as well, arrangements of holes, may be employed. The only absolute requirement necessary for the practice of the present invention is that there exist pairs of holes 12 capable of engaging a certain segment 15 of resilient member 14 which segment 15 will also occupy a substantial percent, that is, at least 25 percent, of the axial length of uniplanar element 10.

Figure 2:
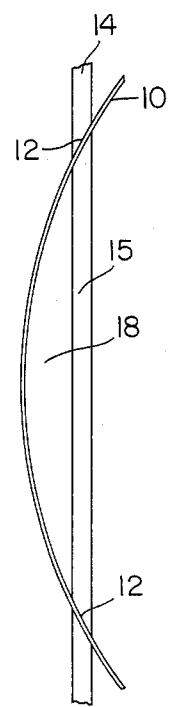
FIG. 2 is a side plan view of the illustration of FIG. 1.

In FIG. 2 is shown the side plane view of the illustration of FIG. 1. Therein it may be noted that holes 12 are proportioned to permit the slideable passage of linear member 14 through a selected pair of holes after the bending or arching of uniplanar element 10 has occurred. As may be further noted, holes 12 will frictionally contact said linear member 14 after member 14 has been placed therethrough. To achieve such frictional contact and securement of uniplanar element 10, relative to linear member 14, holes 12 must have a diameter which is only slightly in excess of the diameter of linear member 14.

Figure 3:
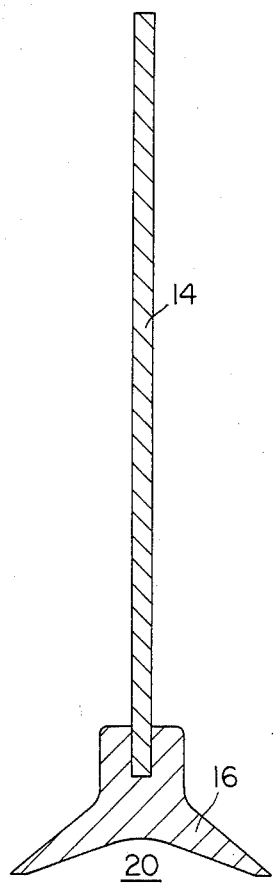
FIG. 3 is a longitudinal cross-sectional view of the linear member in combination with the adhesion means.

In the cross-sectional view of FIG. 3 is shown linear member 14 secured within the elastomeric adhesion means 16 which is positioned upon a surface 20. In a preferred embodiment, adhesion means 16 will be a structure in the nature of a suction cup and surface 20 will be the roof of an automobile. The function of the suction cup will be improved if hand cream, vasoline or moisture is first placed into said cup.

Figure 4:
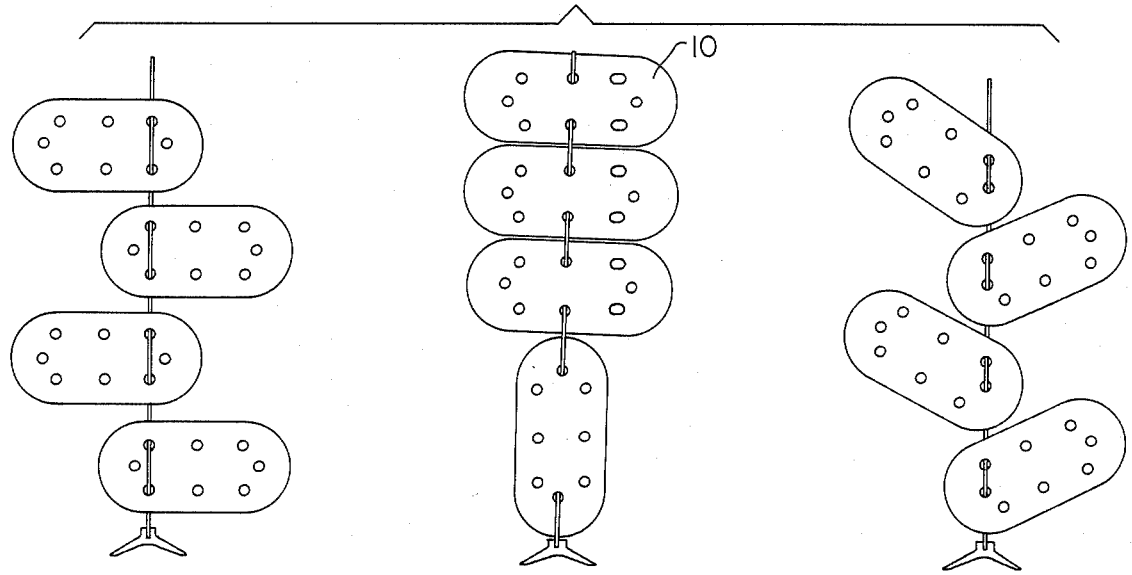

By reference to FIG. 4 may be seen one example of the numerous number of combinations of orientation of the uniplanar elements that may be achieved by employing only four elements wherein each element is provided with the above-mentioned matrix of holes 12. If further identification or differentiation of the object to be identified is desired, each of the four uniplanar elements may be provided with different colors. Accordingly, the obtainable visual combinations upon linear member 14 when selected on the basis of both absolute orientation and of respective mutual orientation, is remarkably large.

It is to be appreciated that the uniplanar elements 10 are small items which, in one embodiment, may be approximately 4 centimeters in width and 10 centimeters in length, and may be conveniently stored, together with linear member 14 and adhesion means 16, in a small bag or pouch conveniently placable within the glove compartment of an automobile. Alternately, the pouch and the linear member may be stored within the glove compartment together with the uniplanar oval shaped elements.

It is to be appreciated that the uniplanar elements may be formed of any brightly colored plastic having a suitable characteristic of resilience or spring action.

Accordingly, while there have been shown and described the preferred embodiment of the present invention, it will be understood that the invention may be embodied otherwise than as herein specifically illustrated or described and that within said embodiments certain changes in the detail and construction, and the form of arrangement of the parts, may be made without departing from the underlying idea or principles of this invention within the scope of the appended claims.

Having thus described my invention, what I claim as new, useful and non-obvious and, accordingly, secure by Letters Patent of the United States is:

1. A mnemonic means for identifying one object out of a multiplicity of like objects, the mnemonic means comprising:
   (a) an adhesion means proportioned for placement on a substantially horizontal surface of said one object to be identified;
   (b) an elongate, resilient linear member having a first end and a second end, said member secured, at said first end, to said ashesion means and placed in a substantially vertical orientation relative to said horizontal surface of said object to be identified;
   (c) a plurality of resilient uniplanar elements, each of said elements having therein a plurality of holes, each of said holes proportioned to permit the slideable passage of said second end of said linear member through a selected pair of said holes after bending of said uniplanar element has occurred, said holes further proportioned to frictionally contact said linear member after said passage of said linear member therethru, thereby maintaining said uniplanar element in a resiliently deformed co-action with said linear member,
   whereby the orientation of one or more of said plurality of the uni-planar on said linear member may be selectively changed through a change in said selected pair of holes within said uniplanar element through which said linear member has been passed and, further whereby, through the use of a predetermined sequence of respective orientations for each of said plurality of elements, the identification of said one object out of said multiplicity of like objects, may be achieved.

2. The means as recited in claim 1 in which said uniplanar elements comprise substantially oval-shaped elements.

3. The means as recited in claim 1 in which said adhesion means comprises suction means.

4. The means as recited in claim 1 in which said one object to be identified comprise an automobile and said plurality of objects comprises a multiplicity of automobiles within a parking lot of automobiles.

5. The means as recited in claim 1 in which said uniplanar elements comprise various colors,
   whereby a color aspect may be thereby added to the permutations of orientation comprising said mnemonic means.

6. The means as recited in claim 1 in which said uniplanar elements comprise elements of like peripheral shape.

7. The means as recited in claim 6 in which said uniplanar elements comprise substantially oval-shaped elements.

8. The means as recited in claim 7 in which surfaces of said elements comprise various colors,
   whereby a color component is thereby added to the permutations of orientation employed by the mnemonic means.

9. The means as recited in claim 8 in which said adhesion means comprises suction means.

10. The means as recited in claim 9 in which said one object to be identified comprises an automobile and said multiplicity of objects comprises a parking lot of automobiles.

* * * * *